(12) United States Patent
Takahashi et al.

(10) Patent No.: US 9,151,892 B2
(45) Date of Patent: Oct. 6, 2015

(54) SPOT SIZE CONVERTER AND METHOD FOR MAKING THE SAME

(75) Inventors: Shigeki Takahashi, Tokyo (JP); Shigeru Nakamura, Tokyo (JP); Masashige Ishizaka, Tokyo (JP); Nobuhide Fujioka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 134 days.

(21) Appl. No.: 14/000,084

(22) PCT Filed: Feb. 1, 2012

(86) PCT No.: PCT/JP2012/052791
§ 371 (c)(1),
(2), (4) Date: Aug. 16, 2013

(87) PCT Pub. No.: WO2012/114866
PCT Pub. Date: Aug. 30, 2012

(65) Prior Publication Data
US 2013/0322816 A1    Dec. 5, 2013

(30) Foreign Application Priority Data

Feb. 21, 2011    (JP) .................................. 2011-034784

(51) Int. Cl.
*G02B 6/12*    (2006.01)
*G02B 6/122*    (2006.01)
(Continued)

(52) U.S. Cl.
CPC .............. *G02B 6/1228* (2013.01); *G02B 6/305* (2013.01); *G02B 6/262* (2013.01)

(58) Field of Classification Search
None
See application file for complete search history.

(56) References Cited

U.S. PATENT DOCUMENTS

| 5,444,805 A | * | 8/1995 | Mayer .............................. 385/49 |
| 6,870,987 B2 | | 3/2005 | Lee |
| 2004/0037497 A1 | | 2/2004 | Lee |

FOREIGN PATENT DOCUMENTS

| JP | 7-168146 A | * | 7/1995 | .............. G02F 1/025 |
| JP | 8-264748 A | | 10/1996 | |
| JP | 2004-258610 A | * | 9/2004 | .............. G02B 6/122 |

(Continued)

OTHER PUBLICATIONS

International Search Report (ISR) (PCT Form PCT/ISA/210), in PCT/JP2012/052791, dated Mar. 6, 2012.

(Continued)

*Primary Examiner* — Mike Stahl
(74) *Attorney, Agent, or Firm* — McGinn IP Law Group, PLLC

(57) ABSTRACT

In order to provide a spot size converter and a method for making the same which enable the optical connection with low loss and are able to reduce the excess loss for the position misalignment in mounting, a spot size converter according to an exemplary aspect of the present invention includes: a substrate on which an optical waveguide including a first core is laminated and which includes a notch; a core reducing part which is formed so that a cross-section area of the first core may gradually decrease toward an end part of the first core in the direction of light propagation; a second core which surrounds the core reducing part and is made of a material whose refractive index is smaller than that of the first core; a peripheral clad which surrounds the second core and is made of a material whose refractive index is smaller than that of the second core; and a lower clad which is formed in a lower part of the second core and includes the peripheral clad; wherein the lower clad is formed in the notch.

10 Claims, 10 Drawing Sheets

(51) Int. Cl.
*G02B 6/30* (2006.01)
*G02B 6/26* (2006.01)

(56) References Cited

FOREIGN PATENT DOCUMENTS

| | | | |
|---|---|---|---|
| JP | 2005-115047 A | | 4/2005 |
| JP | 2005-538426 A | | 12/2005 |
| JP | 2010-266541 A | * 11/2010 ............... G02B 6/14 |

OTHER PUBLICATIONS

Assia Barkai et al., "Double-Stage Taper for Coupling Between SOI Waveguides and Single-Mode Fiber", Journal of Lightwave Technology, vol. 26, No. 24, Dec. 15, 2008, pp. 3860-3865.

Tai Tsuchizawa et al., "Microphotonics Devices Based on Silicon Microfabrication Technology", IEEE Journal of Selected Topics in Quantum Electronics, vol. 11, No. 1, Jan./Feb. 2005, pp. 232-240.

* cited by examiner

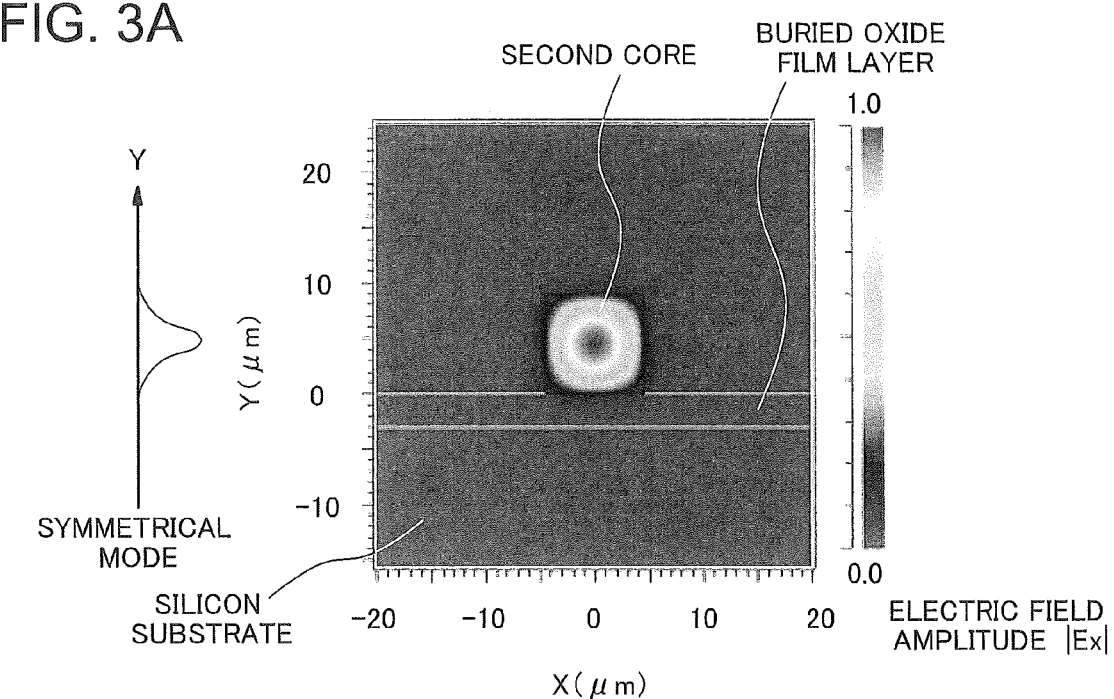
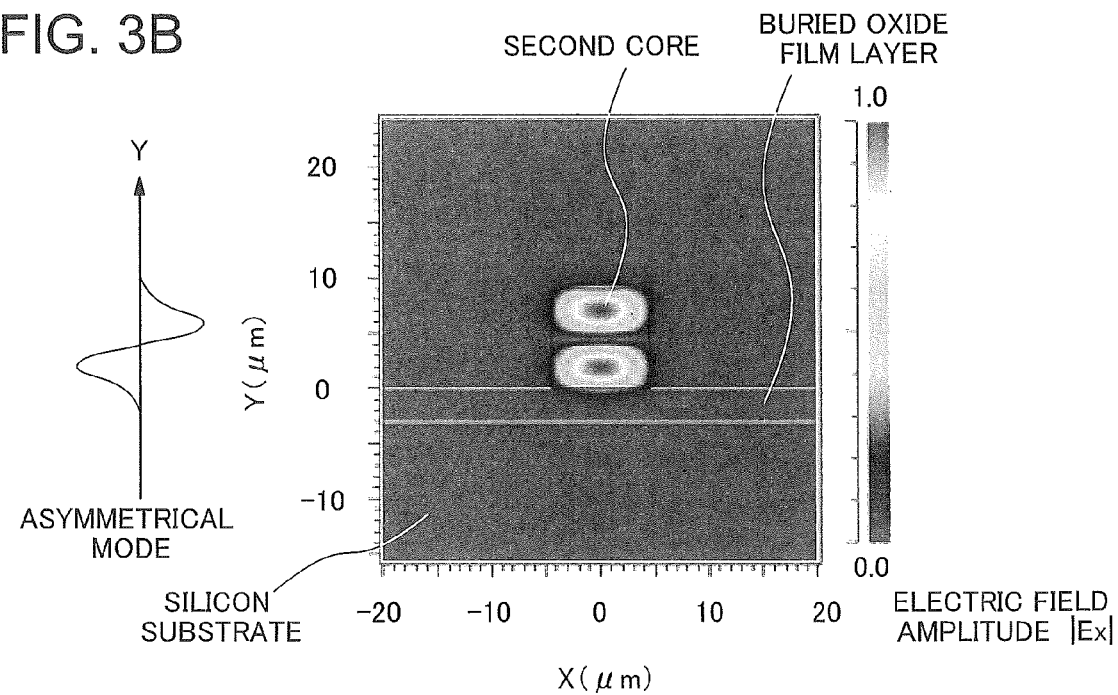

SPOT SIZE CONVERTER AND METHOD FOR MAKING THE SAME

TECHNICAL FIELD

The present invention relates to a spot size converter and a method for making the same by which optical waveguides are optically connected.

BACKGROUND ART

As an optical circuit chip used generally, there is an optical circuit chip having a silica-based optical waveguide which uses silica-based material for both a core and a clad included in an optical waveguide. The relative refractive index difference of the core and the clad is as small as about 0.3% in the silica-based optical waveguide. Therefore, even if the waveguide size is large, single mode conditions are easily satisfied, and the mode field diameter is generally about 5 to 10 μm.

By the way, when an optical circuit chip is connected to another optical component, a form interposing an optical fiber is taken in many cases in order to expand the versatility. The mode field diameter of a commonly-used single mode optical fiber is approximately 9 to 10 μm in the wavelength region of 1.3 μm band and 1.55 μm band, which is close to the mode field diameter of the silica-based optical waveguide. Therefore, it is possible to obtain a low-loss optical coupling between the optical circuit chip having the silica-based optical waveguide and the single mode optical fiber.

On the one hand, in recent years, a research on an optical waveguide with a high refractive index difference is active in which the relative refractive index difference between the core and the clad is increased much larger than that of the silica-based optical waveguide by using, as the core, a high refractive index semiconductor such as silicon and gallium indium arsenide phosphorus. The bend radius of the high refractive index difference optical waveguide is generally equal to or shorter than 100 μm and is a few orders of magnitude less than that of the silica-based waveguide. Therefore, if the high refractive index difference optical waveguide is used, the size of the circuit chip becomes smaller dramatically, which enables significant high-density integration. In particular, in the optical circuit chip using an SOI (Silicon on Insulator) substrate having a silicon oxide film layer and a silicon layer on a substrate, it is possible to utilize a low refractive index silicon oxide film layer as a clad and the high refractive index silicon layer as a core. Therefore, it is possible to divert fine processing technologies and production facilities for silicon processes used for producing an LSI (Large Scale Integration) to the production of the optical circuit chip having the SOI substrate, and its commercialization is highly anticipated.

In the optical circuit chip including such high refractive index difference optical waveguide, it is a connection by means of an optical fiber that is used most widely as a connection method to another optical component. However, while the mode field diameter of a commonly-used single mode optical fiber is equal to 9 to 10 μm, each mode field diameter of most high refractive index difference optical waveguides is equal to several hundred nanometers. Therefore, if the optical fiber is directly connected to the optical circuit chip including the high refractive index difference optical waveguide, a large optical loss is generated because of the large difference between both mode field diameters. As a method for adjusting both mode field diameters to obtain a low-loss optical coupling, there is a method for providing a spot size converter to change a mode field diameter for at least one of an optical circuit chip and an optical fiber. In this case, the spot size converter to expand the mode field diameter is required for the optical circuit chip. On the other hand, the spot size converter to reduce the mode field diameter is required for the optical fiber.

A spot size converter provided for the optical fiber is commonly used in which the core size of the optical fiber gradually decreases toward a connection end to reduce the mode field diameter.

On the other hand, a spot size converter provided for the optical circuit chip is classified into the following two general types. The first type is a spot size converter in which the mode field diameter is expanded by gradually increasing the core size of the optical waveguide toward the connection end of the optical circuit chip. The second type is a spot size converter in which the core size of the optical waveguide is gradually decreased toward a connection end and the core is terminated short of the end face of the optical circuit chip, and the mode field diameter is expanded by transferring the optical energy to the second core formed around the core.

Above-mentioned first type of the spot size converter among the spot size converters provided for the optical circuit chip is described in non-patent literature 1, for example. In this case, by additionally forming a silicon layer about 10 μm thick on an SOI substrate and further processing the thick silicon layer complicatedly, the core size is expanded. Thus, when the core size is expanded, a high refractive index semiconductor to be a core must be formed thick. Therefore, there is a problem that a production cost becomes higher.

Above-mentioned second type of the spot size converter among the spot size converters provided for the optical circuit chip is described in non-patent literature 2, for example. FIG. 1 shows schematic views of a spot size converter 100 described in non-patent literature 2. FIG. 1A is a top view of the spot size converter 100. FIG. 1B is a cross-sectional view taken along the line of FIG. 1A. FIG. 1C is a right side view of FIG. 1A. Although a silicon core 103 and a core reducing part 104 which are shown by a dotted line in FIG. 1A are not actually exposed on an upper surface as shown in FIG. 1B, they are shown in order to make their locations understandable. Much the same is true on the core reducing part 104 shown by a dotted line in FIG. 1C.

In the spot size converter 100 shown in FIG. 1, 200 nm thick of the silicon core 103 on the SOI substrate is processed into a tapered shape. That is to say, the core width is reduced so as to become about 80 nm at the terminal of the silicon core 103 in the direction of the optical propagation. Here, a second core 105 with a cross-sectional surface of 3 μm height by 3 μm width is formed over the core reducing part 104 where the silicon core 103 is made a tapered shape. The second core 105 is made of a material whose refractive index is smaller than that of the silicon core 103 and larger than that of a buried oxide film layer 102, such as a silica-based material. In this case, the optical energy of the light propagating through the silicon core 103 is coupled with and transferred to the waveguide mode in the second core 105 while it is propagating through the core reducing part 104. And the optical energy coupled with the fundamental mode formed in the second core 105 is coupled with a single mode optical fiber.

It is possible to make the spot size converter 100 shown in FIG. 1 in a relatively simple way by means of diverting the manufacturing technology of a silica-based optical waveguide.

Non-patent literature 1: Assia Barkai et al., "Double-Stage Taper for Coupling Between SOI Waveguides and Single- Mode Fiber", JOURNAL OF LIGHTWAVE TECHNOLOGY, VOL. 26, NO. 24, Dec. 15 and 2008, pp. 3860-3865

Non-patent literature 2: Tai Tsuchizawa et al., "Microphotonics Devices Based on Silicon Microfabrication Technology", IEEE JOURNAL OF SELECTED TOPICS IN QUANTUM ELECTRONICS, VOL. 11, NO. 1, January/February 2005, pp. 232-240

DISCLOSURE OF INVENTION

Problem to be Solved by the Invention

The mode field diameter of the second core 105 in non-patent literature 2 is about 4 μm. Therefore, in order to realize a low-loss optical coupling, it is necessary to make the mode field diameter of the optical fiber to be connected about 4 μm at the connection end. In non-patent literature 2, the optical loss at the junction between the spot size converter 100 produced actually and the optical fiber is described. According to this, while the optical loss is equal to 0.5 dB when the spot size converter 100 is connected to an optical fiber with a mode field diameter equal to 4 μm, the optical loss becomes very larger, equal to 2.5 dB when it is connected to a commonly-used optical fiber with a mode field diameter equal to 9 μm On the other hand, when the spot size converter on an optical circuit chip is connected to an optical fiber by a mounting process, an excess loss arises if the position of the optical fiber and its ideal position are misaligned. And the excess loss due to the misalignment becomes larger as the mode field diameter at the connection end between the spot size converter and the optical fiber is smaller. That is to say, the smaller the mode field diameter at the connection end between the spot size converter and the optical fiber is, the smaller an acceptable amount of position misalignment becomes extremely.

FIG. 2 shows the calculated results of the excess optical loss corresponding to the amount of position misalignment of the optical fiber on the assumption that the mode shape of both at the connection end is a Gauss function type. It is found from FIG. 2 that the excess loss corresponding to the position misalignment of 1 μm is equal to 0.2 dB if the mode field diameter of both is equal to 9 μm. On the other hand, it is found that the excess loss corresponding to the position misalignment of 1 μm becomes larger, that is, 1.1 dB if the mode field diameter of both is equal to 4 μm. Therefore, in the light of an excess loss due to the position misalignment, as for the mode field diameter of the spot size converter at the connection end, about 9 μm is more desirable than about 4 μm.

As mentioned above, in the spot size converter described in non-patent literature 2, since the mode field diameter of the second core is about 4 μm, the loss becomes larger if it is connected to the optical fiber with the mode field diameter being about 9 μm. On the other hand, the excess loss for the position misalignment in mounting becomes larger if it is connected to the optical fiber with the mode field diameter being about 4 μm.

In view of such a problem, the objective of the present invention is to provide a spot size converter and a method for making the same which enable the optical connection with low loss and are able to reduce the excess loss for the position misalignment in mounting.

Means for Solving a Problem

A spot size converter according to an exemplary aspect of the present invention includes: a substrate on which an optical waveguide including a first core is laminated and which includes a notch; a core reducing part which is formed so that a cross-section area of the first core may gradually decrease toward an end part of the first core in the direction of light propagation; a second core which surrounds the core reducing part and is made of a material whose refractive index is smaller than that of the first core; a peripheral clad which surrounds the second core and is made of a material whose refractive index is smaller than that of the second core; and a lower clad which is formed in a lower part of the second core and includes the peripheral clad; wherein the lower clad is formed in the notch.

A method for making a spot size converter according to an exemplary aspect of the invention includes: a laminating process for laminating an optical waveguide including a first core including a reducing part whose cross-section area gradually decreases toward an end part in the direction of light propagation, and a second core which surrounds the reducing part and is made of a material whose refractive index is smaller than that of the first core; a side part clad formation process for forming a side part clad at each side of the second core; an upper clad formation process for forming an upper clad in the upper part of the second core; and a lower clad formation process for forming a lower clad in the lower part of the second core; wherein the lower clad formation process includes a substrate removal process for forming a notch by removing a substrate located in an area just beneath the second core.

Effect of the Invention

According to the spot size converter and the method for making the same of the present invention, it becomes possible to realize the optical connection with low loss and reduce the excess loss for the position misalignment in mounting.

BRIEF DESCRIPTION OF THE DRAWINGS

FIG. 3A is a diagram showing an electric field amplitude profile of a mode formed in a second core, and shows the electric field amplitude profile of $E_{11}$ mode (fundamental mode) in the second core.

FIG. 3B is a diagram showing an electric field amplitude profile of a mode formed in the second core, and shows the electric field amplitude profile of $E_{12}$ mode in the second core.

FIG. 6A-2 is a diagram to describe a method for making the spot size converter in the second exemplary embodiment of the present invention and is a top view of the spot size converter.

FIG. 6B-1 is a diagram to describe a method for making the spot size converter in the second exemplary embodiment of the present invention and is a right side view of the spot size converter.

FIG. 6B-2 is a diagram to describe a method for making the spot size converter in the second exemplary embodiment of the present invention and is a cross-sectional view taken along the line d shown in FIG. 6B-1.

DESCRIPTION OF EMBODIMENTS

Figures 1, 6A:
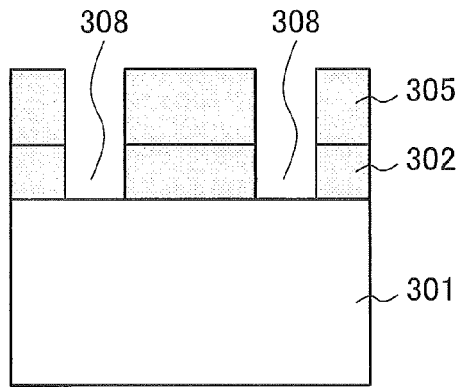
FIG. 6A-1 is a diagram to describe a method for making the spot size converter in the second exemplary embodiment of the present invention and is a right side view of the spot size converter.
Figures 2, 6A:
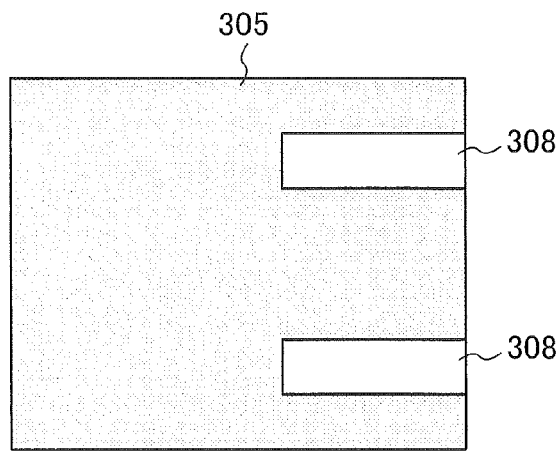

In order to enable the optical connection with low loss and to suppress the excess loss due to the position misalignment in mounting in the spot size converter 100 shown in FIG. 1, it seems to be sufficient that the core width of the end part of the silicon core 103 in the optical waveguide direction is further reduced and the size of the core 105 is enlarged up to about 9 μm.

However, it has been clarified by the propagation analysis using the numerical computation performed by the inventors that the optical loss is extremely large in such a spot size converter. The results of the analysis by the inventors and the thoughts of the inventors about grounds for causing the results are described below.

The inventors have analyzed, by means of the numerical calculation, a spot size converter in which the size of the spot size converter 100 shown in FIG. 1 is changed. In the spot size converter as an analysis object, the thickness of the buried oxide film layer 102 is set at 3 μm, and the thickness of the silicon core 103 is set at 100 nm. In the core reducing part 104, the core width of the silicon core 103 is reduced from 400 nm to 20 nm over the length of 1200 μm in a tapered shape. The cross-sectional dimensions of the second core 105 are set at 9 μm height by 9 μm width. A propagation analysis by means of numerical calculation is performed for the spot size converter. As a result, it has been found out that as many as 77% of the total optical energy has been lost in the TE (Transverse Electric) mode that the direction of the electric field is parallel to X direction (waveguide width direction). The numerical calculation here has been performed by the semivectorial finite-difference beam-propagation method. The refractive index of silicon is set at 3.46, and the refractive index of the peripheral clad 107 is set at 1.46. The peripheral clad 107 functions as a clad for the second core 105, and includes the second upper clad 106 and the buried oxide film layer 102 as the second lower clad. The refractive index of the second core 105 is set at 1.50, and the relative refractive index difference between the second core 105 and the peripheral clad 107 is set at about 3% which is equal to that in non-patent literature 2.

It is considered as a main reason for the optical loss enlarging that most of the optical energy propagating through the core reducing part 104 is coupled to high order waveguide modes formed in the second core 105 (hereinafter, referred to as higher-order mode). FIG. 3 shows electric field amplitude profiles of an $E_{11}$ mode (a fundamental mode) in the second core 105 and an $E_{12}$ mode (higher-order mode) which will be a main reason for the optical loss. Here, the first subscript of E represents the number of the antinodes of the electric field amplitude profile in the X direction (waveguide width direction) and the second subscript represents the number of the antinodes of the electric field amplitude profile in the Y direction (waveguide height direction).

The optical energy coupled to $E_{11}$ mode in the second core 105 will be finally coupled to a waveguide mode in a waveguide to be connected such as an optical fiber. Here, if the size of the second core 105 is enlarged to be 9 μm height by 9 μm width, the overlap integration between the optical mode propagating through the core reducing part 104 and the $E_{11}$ mode becomes smaller. Therefore, the optical energy coupled to $E_{11}$ mode shown in FIG. 3A becomes smaller to be 23%. On the other hand, over ten kinds of higher-order modes arise in the second core 105 whose core size becomes larger, and as many as 46% of the total optical energy is coupled to the $E_{12}$ mode shown in FIG. 3B, for example.

The overlap integration means overlap integration between electric fields. For example, if E1 represents an electric field in mode 1 and E2 represents an electric field in mode 2, the overlap integration is obtained by the integration shown in following formula (1) in a section perpendicular to the propagation direction (XY plane). And the overlap integration can be used as an index measuring the strength of the coupling between mode 1 and mode 2.

$$\int\int_{-\infty}^{\infty} E_1 \cdot E_2 \, dX \, dY \qquad \text{formula (1)}$$

Thus, in the spot size converter shown in FIG. 1, just further reducing the core width at the terminal of the core reducing part 104 and enlarging the core size of the second core 105, the coupling to the fundamental mode decreases, and the coupling to higher-order modes increases. Therefore, it is impossible to form a spot size converter with low loss.

As a means to, solve this problem, there seems to be a way that the occurrence of higher-order modes in the second core 105 is avoided by lowering a relative refractive index difference between the second core 105 and the peripheral clad 107. However, if the relative refractive index difference is lowered, the electric field of the fundamental mode in the second core 105 deeply penetrates into the second lower clad, that is, the buried oxide film layer 102. Therefore, if there is a substrate made of a high refractive index material such as silicon under the buried oxide film layer 102, it is desirable to thicken the buried oxide film layer 102 in order to avoid the leakage of the optical energy into the substrate. Alternatively, it is desirable to make the substrate 101 of a material having a lower refractive index than the second core 105.

Accordingly, reducing the relative refractive index difference between the second core 105 and the peripheral clad 107 to 0.3%, setting the refractive index of the substrate 101 at 1.46 identical with that of the peripheral clad 107, and setting the others at the same conditions as the above, the numerical calculation is performed. However, it is found out that 51% optical energy loss arises even in this case. It is considered that this is because $E_{12}$ mode arises even if the relative refractive index difference is equal to 0.3% and 34% optical energy of the total is coupled to $E_{12}$ mode. On the other hand, if the relative refractive index difference is made further smaller than 0.3%, the capability to confine the light becomes weakened, and the mode field diameter of the fundamental mode varies greatly according to a subtle change in the relative refractive index difference. Therefore, it is not desirable to make the relative refractive index difference smaller than 0.3%. The overlap integration between the optical mode propagating through the core reducing part 104 and the E11 mode remains small only by reducing the relative refractive index difference. Therefore, it is impossible to couple the optical energy to the fundamental mode efficiently.

Accordingly, it has been found out that, in order to realize a low-loss spot size converter even if the core size of the second core 105 is large, it is fundamentally required to enlarge the overlap integration between the optical mode propagating through the core reducing part 104 and the fundamental mode in the second core 105.

Based on those analysis results, the exemplary embodiments of the present invention will be described with reference to drawings. However, those exemplary embodiments do not limit the technical scope of the present invention.

The First Exemplary Embodiment

Figure 4A:
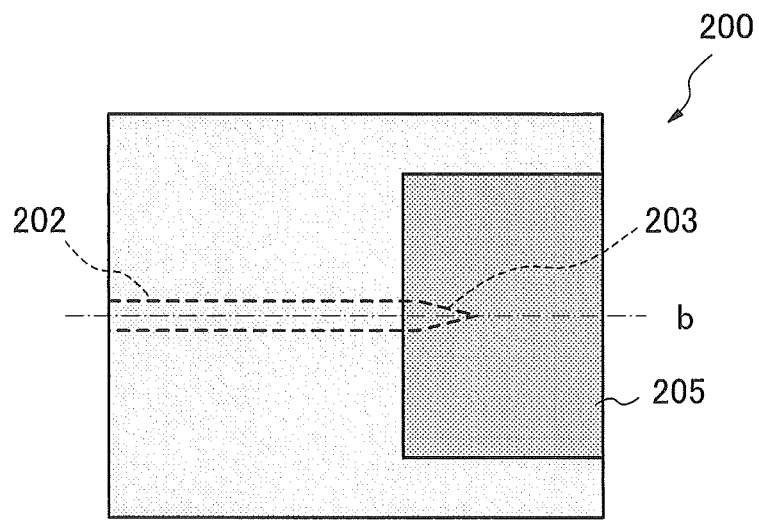
FIG. 4A is a top view showing a schematic configuration of a spot size converter in the first exemplary embodiment of the present invention.
Figure 4B:
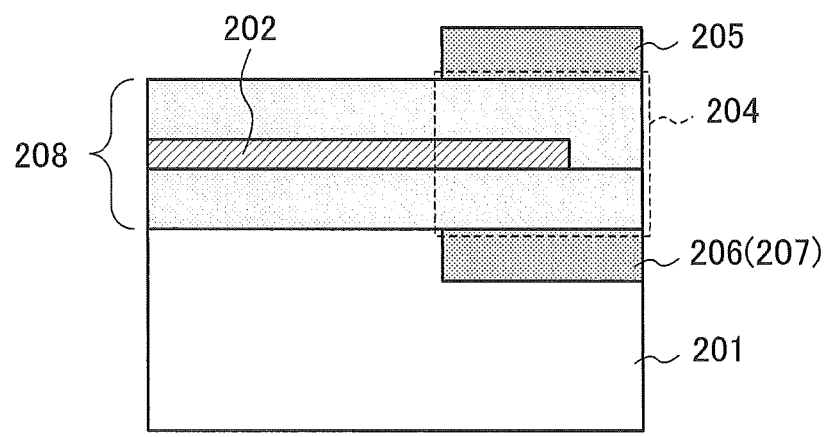
FIG. 4B is a diagram showing a schematic configuration of the spot size converter in the first exemplary embodiment of the present invention and is a cross-sectional view taken along the line b shown in FIG. 4A.
Figure 4C:
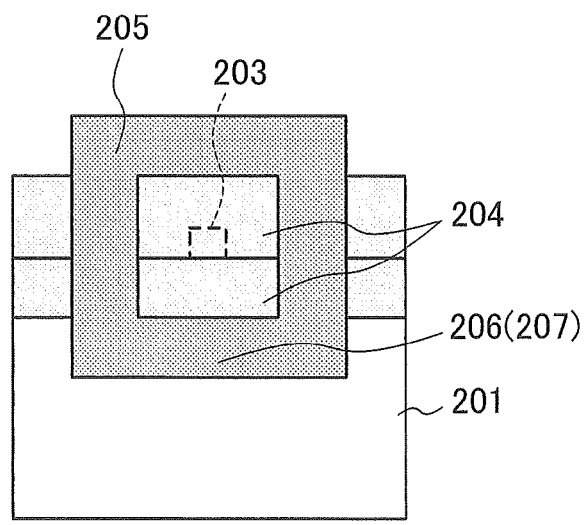
FIG. 4C is a diagram showing a schematic configuration of the spot size converter in the first exemplary embodiment of the present invention and is a right side view of FIG. 4A.

A spot size converter 200 in the first exemplary embodiment of the present invention will be described using FIG. 4. FIG. 4A is a top view of the spot size converter 200. FIG. 4B is a cross-sectional view taken along the line b shown in FIG. 4A. FIG. 4C is a right side view of FIG. 4A. Although a first core 202 and a core reducing part 203 which are shown by a dotted line in FIG. 4A are not actually exposed on an upper surface as shown in FIG. 4B, they are shown in order to make their locations understandable. Much the same is true on the core reducing part 203 shown by a dotted line in FIG. 4C.

The spot size converter 200 includes a substrate 201, the first core 202, the core reducing part 203, a second core 204, and a peripheral clad 205. A lower clad 206, formed in a lower part of the second core 204 and composing the peripheral clad 205, is formed in an area where a part of the substrate 201 is notched (hereinafter, referred to as a notch 207).

An optical waveguide 208 including the first core 202 is laminated on the substrate 201. The core reducing part 203 is a part which is formed so that the cross-section area of the first core 202 gradually may decrease toward an end part of the first core 202 in the direction of the light propagation. Here, the cross-section area is defined as an area which becomes exposed in cutting the first core 202 in a direction perpendicular to the light propagation direction. The core reducing part 203 is terminated short of the end face of the spot size converter 200. That is to say, the core reducing part 203 is terminated short of the end face of the second core 204 in the light propagation direction. The second core 204 surrounds the core reducing part 203 and is made of a material whose refractive index is smaller than that of the first core 202. The peripheral clad 205 surrounds the second core 204 and is made of a material whose refractive index is smaller than that of the second core 204.

Next, a function of the spot size converter 200 will be described.

The electric field of the light propagating through the first core 202 deeply penetrates from the first core 202 to the second core 204 as it approaches the end of the core reducing part 203, that is, the end part of the first core 202. And the optical energy of the light propagating through the optical waveguide 208 is gradually coupled to the waveguide mode formed by the second core 204 and the peripheral clad 205.

Here, in the present exemplary embodiment, the lower clad 206 located in the lower part of the second core 204 is formed in the notch 207. That is to say, by forming the notch 207, the second core 204 and the peripheral clad 205 are formed not only above the core reducing part 203 but also below it. Therefore, it is possible to be configured to bring the center of the fundamental mode of the second core close to the core reducing part as compared with the spot size converter 100 shown in FIG. 1. As a result, the overlap integration between the optical mode propagating through the core reducing part 203 and the $E_{11}$ mode (fundamental mode) enlarges. On the other hand, a $E_{12}$ mode (higher-order mode) is the asymmetrical mode in which there exist two antinodes in the Y-direction. Therefore, the overlap integration between the optical mode propagating through the core reducing part 203 and the $E_{12}$ mode (higher-order mode) becomes smaller. Accordingly, most of the optical energy of light propagating through the first core 202 becomes coupled to the $E_{11}$ mode in the second core 204. That is to say, when the spot size converter 200 is used, it is much less likely to be optically coupled to the higher-order mode because the optical coupling to the fundamental mode of the second core increases.

Accordingly, in the spot size converter 200, even if the mode field diameter of the second core, that is, the mode field diameter in the connection end is enlarged, it is possible to make the optical loss smaller. Since it is possible to enlarge the mode field diameter in the connection end, it becomes possible to reduce excessive loss due to position misalignment in cases of mounting it on the other optical parts such as an optical fiber.

As mentioned above, the spot size converter 200 in the present exemplary embodiment enables low-loss optical connection, and is also able to reduce the excess loss for the position misalignment in mounting.

The Second Exemplary Embodiment

Figure 5A:
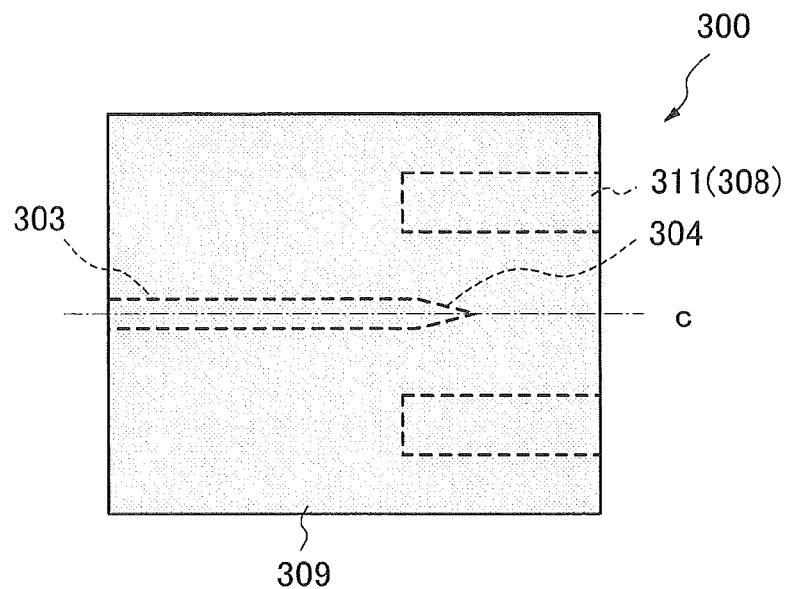
FIG. 5A is a top view showing a schematic configuration of a spot size converter in the second exemplary embodiment of the present invention.
Figure 5B:
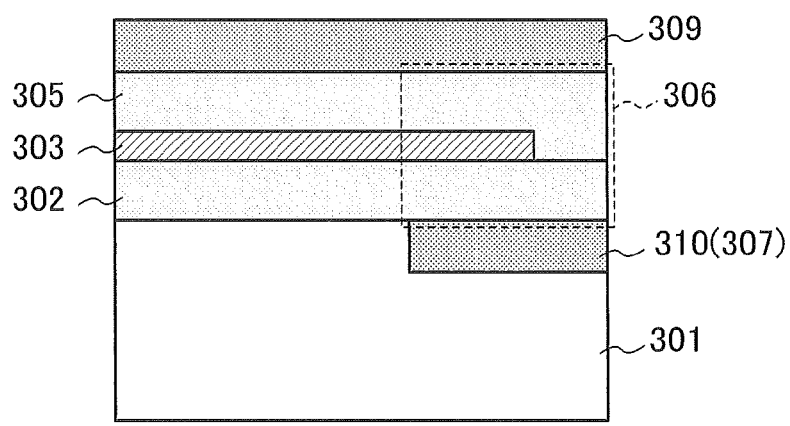
FIG. 5B is a diagram showing a schematic configuration of the spot size converter in the second exemplary embodiment of the present invention, and is a cross-sectional view taken along the line c shown in FIG. 5A.
Figure 5C:
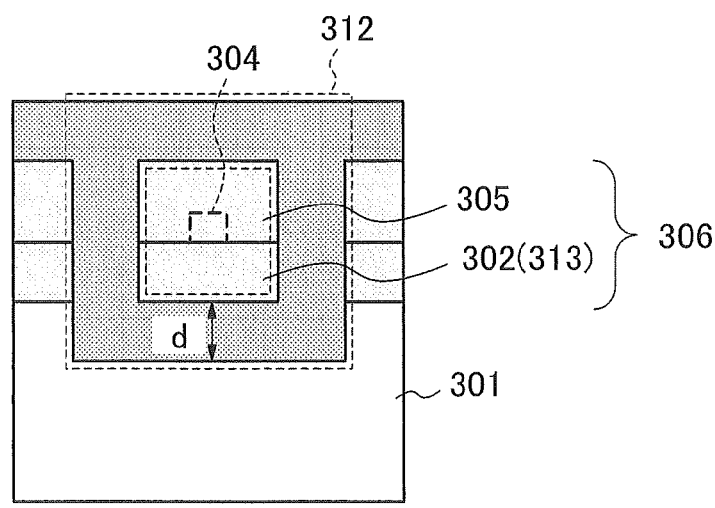
FIG. 5C is a diagram showing a schematic configuration of the spot size converter in the second exemplary embodiment of the present invention, and is a right side view of FIG. 5A.

A spot size converter 300 in the second exemplary embodiment of the present invention will be described using FIG. 5. FIG. 5A is a top view of the spot size converter 300. FIG. 5B is a cross-sectional view taken along the line c shown in FIG. 5A. FIG. 5C is a right side view of FIG. 5A. Although every one of a silicon core 303, a core reducing part 304, and a second side part clad 311, which is shown by dotted lines in FIG. 5a, is not actually exposed on an upper surface as shown in FIG. 5B, they are shown in order to make their locations understandable. Much the same is true on the core reducing part 304 shown by a dotted line in FIG. 5C.

The spot size converter 300 includes an SOI substrate. The SOI substrate in the present exemplary embodiment includes a silicon substrate 301, a buried oxide film layer (BOX layer) 302, and a silicon core 303.

The silicon substrate 301 is made of a silicon with its refractive index equal to 3.46. The buried oxide film layer 302 is made of $SiO_2$ with 3 μm thick and its refractive index equal to 1.4644. The silicon core 303 is made of silicon with 100 nm thick and its refractive index equal to 3.46. The silicon core 303 is formed by processing a silicon layer on the buried oxide film layer (BOX layer) 302 to make a silicon wire waveguide with a core reducing part 304. In the core reducing part 304, the cross-section area of the silicon core 303 gradually decreases toward an end part in the optical waveguide direction. In the core reducing part 304 of the present exemplary embodiment, the core width of the silicon core 303 is reduced from 400 nm to 80 nm over the length of 1200 μm in a tapered shape.

A first upper clad 305 with 6 μm thick which is made of a silica-based material with a refractive index equal to 1.4644 is formed on the upper part of the silicon core 303. The first upper clad 305 acts as an over-clad for the silicon core 303 in the area other than the surrounding area of the core reducing part. On the other hand, in the area where the optical energy makes the transition to the second core 306, that is, in the neighborhood of the core reducing part 304, the second core 306 with 9 μm height by 9 μm width is composed by the first upper clad 305 and the buried oxide film layer 302. And a notch 307, an area where a part of the silicon substrate 301 is removed, is formed in the area just beneath the second core 306. A trench 308 is formed on both sides of the second core 306. And a silica-based material with its refractive index equal to 1.4600 is inserted into the first upper clad 305, the notch 307, and the trench 308, respectively. This enables a second upper clad 309 to be formed on the first upper clad 305. And, a second lower clad 310 is formed in the notch 307. A second side part clad 311 is formed in the trench 308. And a peripheral clad 312 of the second core 306 is composed by the second upper clad 309, the second lower clad 310, and the second side part clad 311.

Here, the relative refractive index difference between the second core 306 and the peripheral clad 312 is equal to 0.3%. It is only necessary that the thickness d of the peripheral clad 312 is enough to come into a state in which most of the electric fields of the fundamental mode formed in the second core 306 exist in the second core 306 and the peripheral clad 312.

Next, a method for making the spot size converter 300 in the present exemplary embodiment will be described using FIG. 6.

First, an SOI substrate is prepared which includes a 3 μm-thick buried oxide film layer 302 and a 100 nm-thick silicon layer on the silicon substrate 301. And the silicon layer is processed by means of a mask formation process and an etching process by the commonly-used lithography, and the silicon core 303 of a silicon wire waveguide with the core reducing part 304 is formed.

Figure 1A:
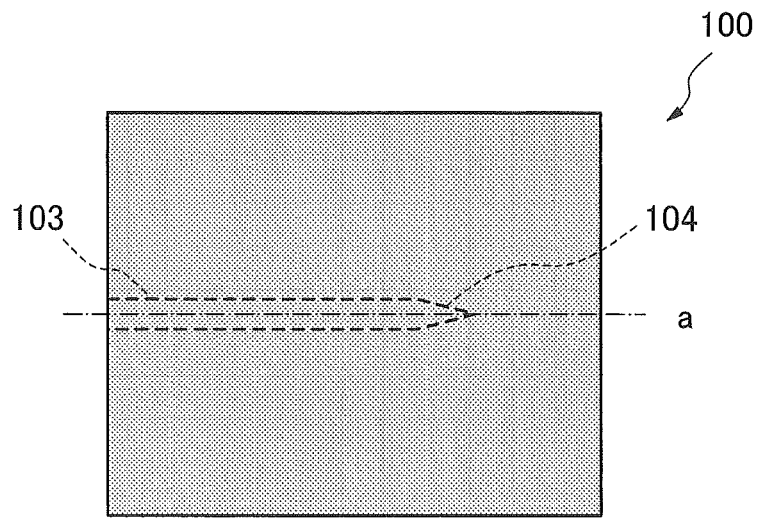
FIG. 1A is a top view showing a schematic configuration of a related spot size converter to the present invention.
Figure 1B:
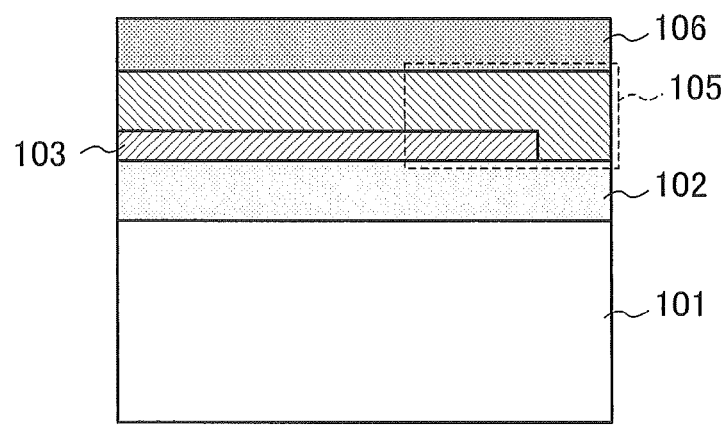
FIG. 1B is a diagram showing a schematic configuration of a related spot size converter to the present invention and is a cross-sectional view taken along the line of FIG. 1A.
Figure 1C:
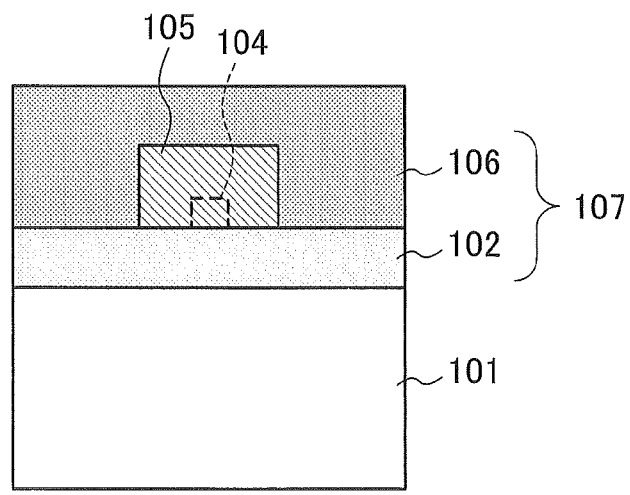
FIG. 1C is a diagram showing a schematic configuration of a related spot size converter to the present invention and is a right side view of FIG. 1A.
Figure 2:
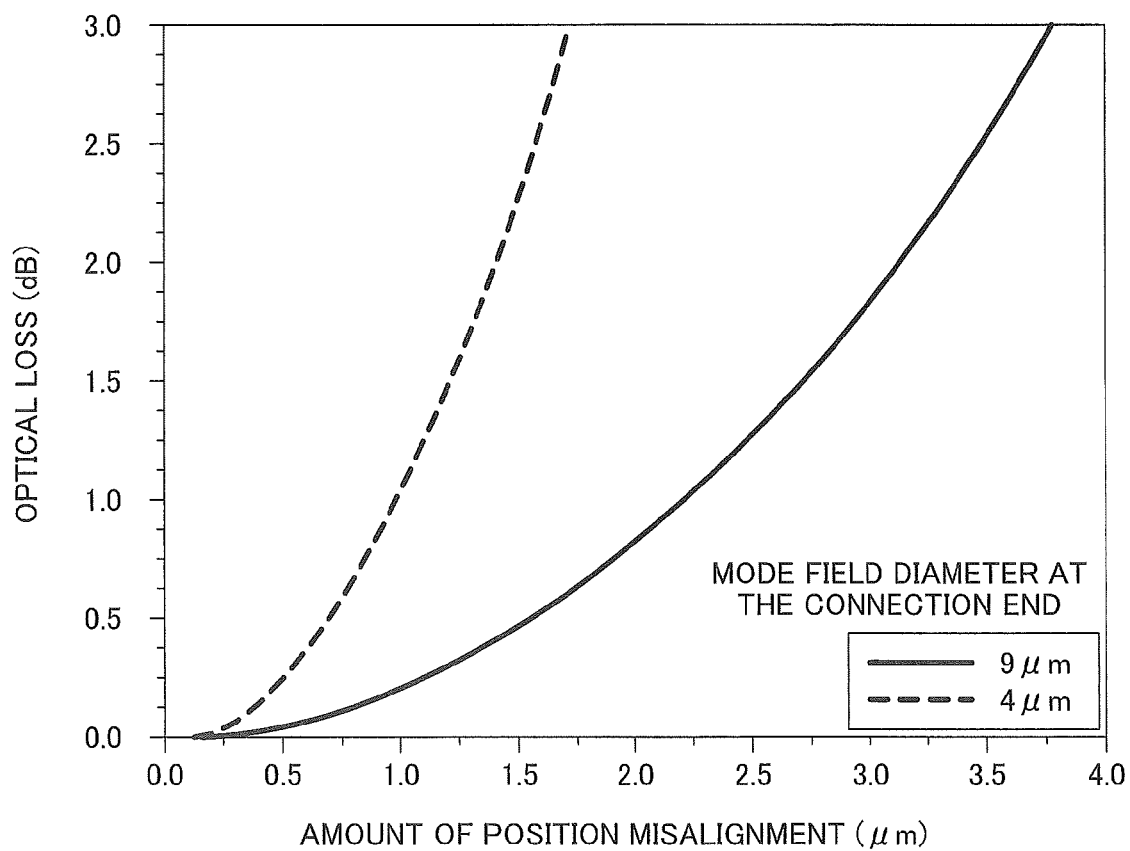
FIG. 2 shows calculated results of the excess optical loss when position misalignment arising between a spot size converter and an optical waveguide to be connected.

Next, a silica-based material is deposited using a deposition method such as a CVD (Chemical Vapor Deposition) method, and the 6 μm-thick first upper clad 305 is formed. And as shown in FIGS. 6A-1 and 6A-2, the trench 308 is formed by means of the mask formation process and an etching process by the commonly-used lithography. FIG. 6A-2 is a top view of the spot size converter 300, and FIG. 6A-1 is a right side view.

Figures 1, 6B:
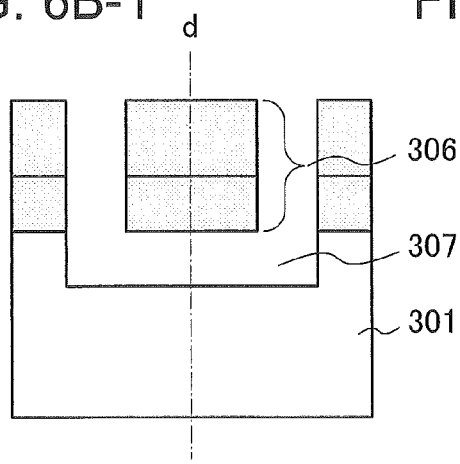
Figures 2, 6B:
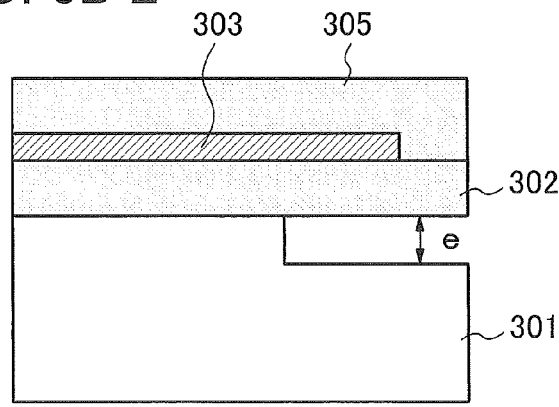

And an etchant or an etching gas for the silicon substrate 301 is introduced from the trench 308. By that means, as shown in FIGS. 6B-1 and 6B-2, the silicon substrate 301 located immediately below the second core 306 is undercut, and the notch 307 is formed. FIG. 6B-1 is a right side view of the spot size converter 300, and FIG. 6B-2 is a cross-sectional view taken along the line d shown in FIG. 6B-1. It is desirable to use the etchant or the etching gas which hardly etches the second core 306 but can etch only the silicon substrate 301 selectively.

Figure 6C:
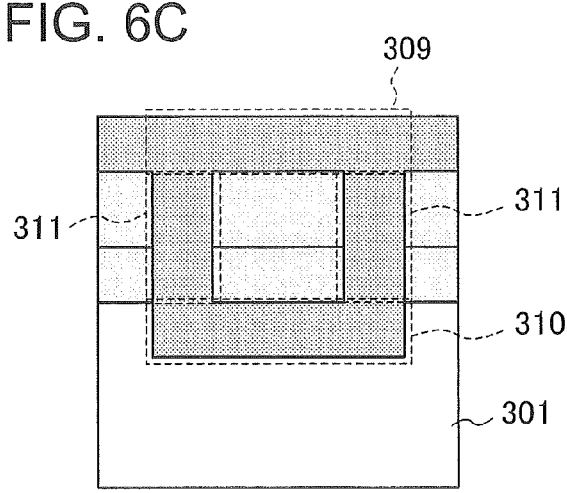
FIG. 6C is a diagram to describe a method for making the spot size converter in the second exemplary embodiment of the present invention and is a right side view of the spot size converter.

Next, a liquid SOG (Spin on Glass) is disposed in the trench 308 by a spin coating and the SOG is solidified. By that means, as shown in FIG. 6C, a silica-based material is inserted into the notch 307 and the trench 308, and the second lower clad 310 and the second side part clad 311 are formed. The second upper clad 309 is also formed by the spin coating of the SOG. Here, if the thickness of the upper clad 309 is insufficient, it is also acceptable to thicken the upper clad 309 by further depositing the silica-based material using a CVD method or an SOG. As a method for inserting the silica-based material into the notch 307 and the trench 308, it is also possible to use a technique such as a dip coating besides the spin coating of the SOG.

As mentioned above, the spot size converter 300 in the present exemplary embodiment is produced.

Next, the reason is described why the notch 307 is formed and the second lower clad 310 is inserted into the notch 307 in the present exemplary embodiment.

As a method for enlarging the overlap integration between the optical mode propagating through the core reducing part 304 and the fundamental mode in the second core 306, the following method can be considered. That is to say, a method can be considered for forming a layer to become the second core (hereinafter, referred to as a second lower core layer) not only above the core reducing part 304 but also below it and for moving the center of the fundamental mode in the second core closer to the core reducing part. Here, if the refractive index distribution in the cross-sectional surface of the second core (a cross-sectional surface perpendicular to the direction of the optical propagation of the second core) is top-bottom asymmetric or left-right asymmetric, a few gaps arise between the center of the fundamental mode in the second core and the center of the cross-sectional surface of the second core. However, the present exemplary embodiment is described assuming that the center of the fundamental mode in the second core approximately coincides with the center of the cross-sectional surface of the second core. Therefore, in order to move the center of the fundamental mode in the second core 306 closer to the position of the core reducing part 304, it is possible to form about 4.5 μm-thick second lower core layer and the second lower clad disposed in the further lower part if the height of the second core 306 is set at 9 μm. However, if the second lower core layer and the second lower clad formed on the substrate are thickened, the production cost is raised, and moreover a stress and a warp of the substrate due to the difference in coefficient of thermal expansion of materials become remarkable. Therefore, there is a case causing adverse effects on a production yield and optical characteristics. In a commonly-used SOI substrate, a silicon substrate is formed under the buried oxide film layer, and the refractive index of the silicon substrate is larger than that of the buried oxide film layer. Therefore, if the second lower core layer is composed of the buried oxide film layer and the second lower clad is composed of the silicon substrate, a large optical loss arises. Therefore, in the spot size converter using an SOI substrate as-is, it is difficult to enlarge the overlap integration between the optical mode propagating through the core reducing part and the fundamental mode in the second core.

The notch 307, therefore, is formed in the spot size converter 300 in the present exemplary embodiment. And the second lower clad 310 made of a material whose refractive index is lower than that of the second core 306 is formed in the notch 307. That is to say, in the present exemplary embodiment, in even spot size converter using the SOI substrate having the silicon substrate, it is possible to form easily, in the lower part of the core reducing part 304, the second lower core layer 313 and the second lower clad 310 made of a material whose refractive index is lower than that of the second lower core layer 313. Therefore, it becomes possible to enlarge the overlap integration between the optical mode propagating thorough the core reducing part 304 and the fundamental mode of the second core 306. It is only necessary to form the notch 307 at least in the neighborhood of the core reducing part 304. Therefore, it is possible to suppress minimally the generation of a stress and a warp of the substrate due to the difference in coefficient of thermal expansion of materials.

For the reasons mentioned above, in the present exemplary embodiment, it is decided to form the notch 307 and the second lower clad 310 in the notch 307.

Next, a function of the spot size converter 300 in the present exemplary embodiment will be described. The electric field of the light propagating through the silicon core 303 deeply penetrates from the silicon core 303 to the second core 306 as it approaches the end of the core reducing part 304. And the optical energy of the light propagating through the silicon core 303 is gradually coupled to the waveguide mode formed by the second core 306 and the peripheral clad 312.

In the spot size converter 300 in the present exemplary embodiment, it becomes possible by forming the notch 307 to form thickly the second core and the peripheral clad not only above the core reducing part 304 but also below it. Therefore, as compared with the related spot size converter 100 described in FIG. 1, it is possible to bring the center of the fundamental mode of the second core close to the core reducing part. As a result, the overlap integration between the optical mode propagating through the core reducing part 304 and the $E_{11}$ mode in the second core 306 (fundamental mode in the second core) enlarges. On the other hand, the overlap integration between the optical mode propagating through the core reducing part 304 and the $E_{12}$ mode in the second core 306 (higher-order mode) becomes smaller. Accordingly, most of the optical energy of the light propagating through the silicon core 303 becomes coupled to the $E_{11}$ mode. By that means, even if the mode field diameter in the connection end is enlarged, it is possible to realize the spot size converter with low-loss.

The inventors have actually performed a propagation analysis by means of numerical calculation for the spot size converter 300 using the semivectorial finite-difference beam-propagation method. As a result, it has been found out that 89% of the optical energy is coupled to the $E_{11}$ mode in the TE mode and the loss of the optical energy is only 0.5 dB.

As mentioned above, low-loss optical connection becomes possible by using the spot size converter 300 in the present exemplary embodiment. And, since it is possible to enlarge the mode field diameter of the second core up to 9-10 μm, for example, it is also possible to reduce the excessive loss for the position misalignment in mounting.

In addition, it is only necessary to form the notch 307 at least in the area to be located directly below the second core 306. That is to say, it is unnecessary to form a thick lower clad layer over the entire substrate. In the present exemplary embodiment, therefore, it is possible to suppress minimally the generation of a stress and a warp of the substrate due to the difference in coefficient of thermal expansion of materials.

It is possible to prevent the light having made the transition to the second core 306 from leaking into the silicon substrate 301 by keeping the sufficient thickness e of the notch 307 shown in FIG. 6B-2.

In the present exemplary embodiment, the second upper clad 309, the second lower clad 310, and the second side part clad 311 are formed using the same material by means of the methods such as a spin coating or a dip coating of SOG. Therefore, it is possible to simplify the production process as compared with a case where each is formed by using a different material.

Although the spot size converter 300 in the present exemplary embodiment is configured to use the SOI substrate having the silicon substrate, it is not limited to this. That is to say, as long as the magnitude relationship of the refractive index is similar to that in the present exemplary embodiment, it does not matter what kind of material is used. Instead of the SOI substrate having the silicon substrate, for example, it is also acceptable to use an SOI substrate having a silica-based substrate. And it is also acceptable to use a compound substrate composed of III-V group materials and the like instead of the silicon substrate 301 or a silica-based substrate. As for the optical waveguide structure, it is also possible to change the material properly. It is also acceptable to use, for example, a core composed of a compound of gallium indium arsenide phosphorus instead of the silicon core 303. And it is also acceptable to use a layer composed of other material whose refractive index is lower than that of the silicon core 303 instead of the buried oxide film layer 302.

In the present exemplary embodiment, as shown in FIG. 5, the second upper clad 309 is formed on the entire upper surface of the spot size converter 300, but it is not limited to this. It is also acceptable to form the second upper clad 309 in the only range to be located immediately above the second core, as the spot size converter 200 shown in FIG. 4, for example.

In the case of connecting the spot size converter 300 to an optical fiber, it becomes possible to suppress the reflection of the light at the both connection ends if the refractive index of the second core 306 is equalized to that of the core of the optical fiber.

Figure 7A:
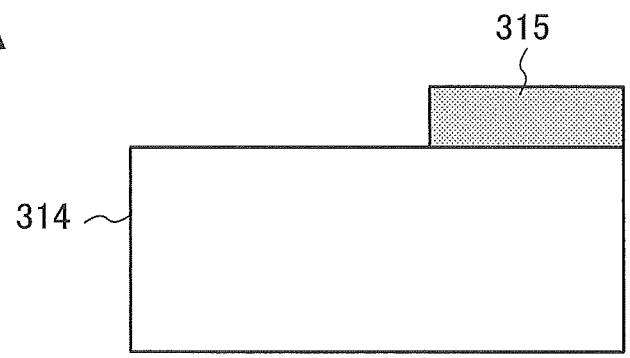
FIG. 7A is a cross-sectional view showing another method for making the spot size converter in the second exemplary embodiment of the present invention.
Figure 7B:
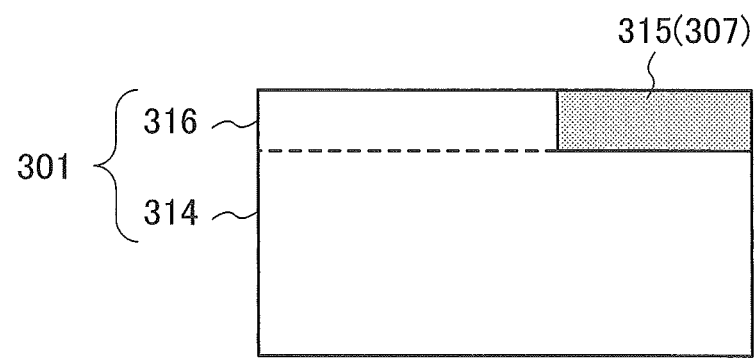
FIG. 7B is a cross-sectional view showing another method for making the spot size converter in the second exemplary embodiment of the present invention.

In addition, in the present exemplary embodiment, the notch 307 is formed by removing the silicon substrate 301 by etching process, but it is not limited to this. It is also acceptable to form the notch 307 by making the silicon substrate in two divided steps, for example. Specifically, as shown in FIG. 7A, a silica-based material is deposited as a mask 315 on the first silicon substrate 314. And then, as shown in FIG. 7B, a second silicon substrate 316 is grown. By that means, the silicon substrate 301 in which the first silicon substrate 314 is combined with the second silicon substrate 316 can include the notch 307 as a whole in the area where the mask 315 is deposited. It is necessary for the mask 305 to be made of a material whose refractive index is smaller than that of the buried oxide film layer 302 in order to make the mask 305 function as the second lower clad 310.

The Third Exemplary Embodiment

Figure 8A:
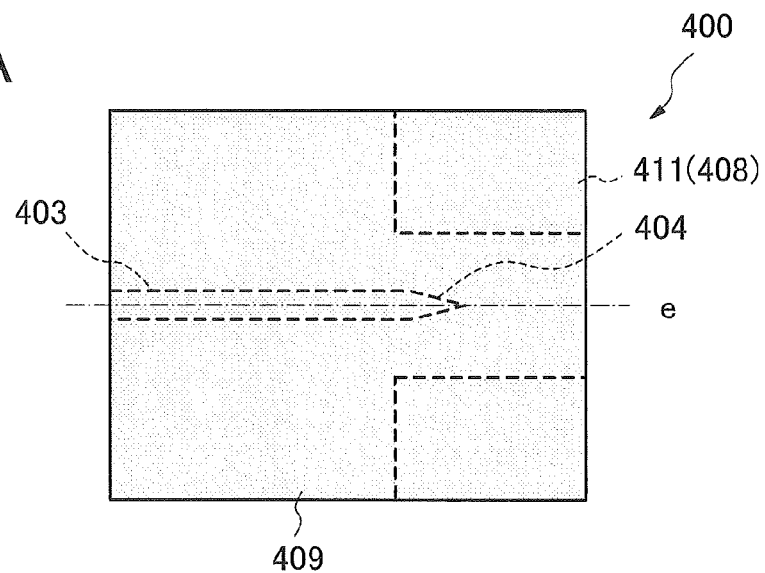
FIG. 8A is a top view showing a schematic configuration of a spot size converter in the third exemplary embodiment of the present invention.
Figure 8B:
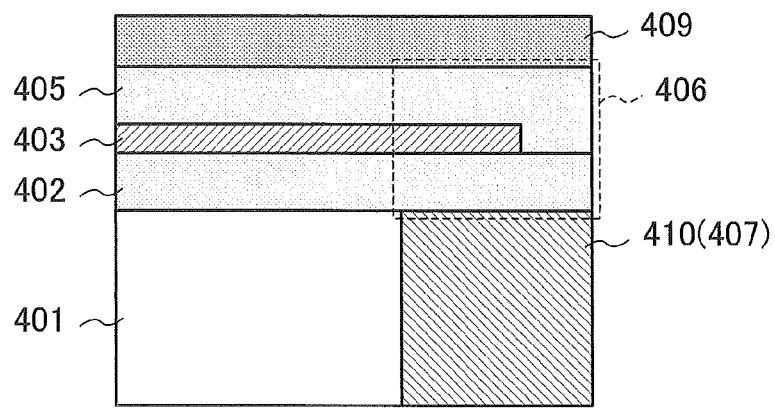
FIG. 8B is a diagram showing a schematic configuration of the spot size converter in the third exemplary embodiment of the present invention, and is a cross-sectional view taken along the line e shown in FIG. 8A.
Figure 8C:
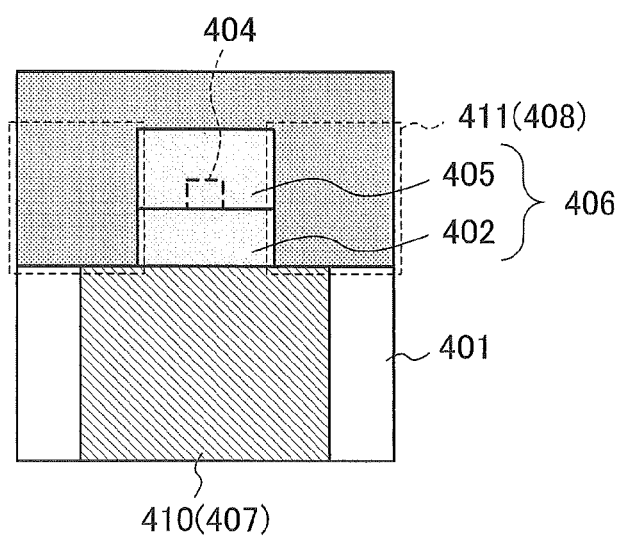
FIG. 8C is a diagram showing a schematic configuration of the spot size converter in the third exemplary embodiment of the present invention, and is a right side view of FIG. 8A.

A spot size converter 400 in the third exemplary embodiment of the present invention will be described using FIG. 8. FIG. 8A is a top view of the spot size converter 400. FIG. 8B is a cross-sectional view taken along the line e shown in FIG. 8A. FIG. 8C is a right side view of FIG. 8A. Although every one of a silicon core 403, a core reducing part 404, and a second side part clad 411, which is shown by dotted lines in FIG. 8A, is not actually exposed on an upper surface as shown in FIG. 8B, they are shown in order to make their locations understandable. Much the same is true on the core reducing part 404 shown by a dotted line in FIG. 8C.

The spot size converter 400 includes an SOI substrate having a silicon substrates 401, an buried oxide film layer (BOX layer) 402 with 3 μm thick, and a silicon core 403.

The end part of the silicon core 403 in the optical waveguide direction is terminated by the core reducing part 404 whose core width is reduced in a tapered shape.

A first upper clad 405 with 6 μm thick which is made of a silica-based material with a refractive index equal to 1.4644 is formed on the upper part of the silicon core 403. The first upper clad 405 acts as an over-clad for the silicon core 403 in the area other than the surrounding area of the core reducing part 404. On the other hand, in the area where the optical energy makes the transition to the second core 406, that is, in the neighborhood of the core reducing part 404, the second core 406 is composed by the first upper clad 405 and the buried oxide film layer 402.

A notch 407, an area where a part of the silicon substrate 401 is removed, is formed in the area just beneath the second core 406. A trench 408 is formed on both sides of the second core 406. And a material whose refractive index is smaller than that of the second core 406 is inserted into the upper surface of the first upper clad layer 405, the notch 407, and the trench 408, respectively. By that means, a second upper clad layer 409 is formed on the first upper clad 405. A second lower clad layer 410 is formed in the notch 407. A second side part clad layer 411 is formed in the trench 408. And a peripheral clad 412 of the second core 406 is composed by the second upper clad layer 409, the second lower clad layer 410, and the second side part clad layer 411.

Here, the notch 407 in the present exemplary embodiment is an area where the silicon substrate 401 is removed through it from the upper surface (a surface on which an optical waveguide is laminated) to the rear surface. Therefore, it is possible to form the second lower clad 410 by means of a method for depositing from the rear surface side of the silicon substrate. As a result, there is an advantage that options of the type of materials for the second lower clad 410 increase. It also becomes possible to form a plurality of layers with their refractive indexes different mutually in the notch 407. In addition, it becomes possible to form the second upper clad 409 and the second side part clad 411 using a material different from one for the second lower clad 410. That is to say, it is possible to set the refractive indexes independently. If the refractive index of the second lower clad 410, for example, is made larger than that of the second upper clad 409, it is possible to displace the center of the fundamental mode formed in the second core 406 toward the silicon substrate 410 sides. Therefore, even if the thickness of the buried oxide film layer 402 is smaller than that of the first upper cladding layer 405, it is possible to bring the center of the fundamental mode in the second core 406 close to the core reducing part 404.

Next, a procedure for making the spot size converter 400 in the present exemplary embodiment will be described. First, a 100 nm-thick silicon layer formed on the buried oxide film layer 402 of an SOI substrate is processed by means of a mask formation process and an etching process by the commonly-used lithography. By that means, the silicon core 403 including a silicon wire waveguide with the core reducing part 404 is formed.

Next, the 6 μm-thick first upper clad 405 made of a silica-based material whose refractive index is smaller than that of the silicon core 403 is formed on the buried oxide film layer 402 and the silicon core 403 by using a deposition method such as a CVD method. Here, the buried oxide film layer 402 and the first upper clad 405, which are formed near the core reducing part 404, compose the second core 406. The optical energy of the light propagating through the silicon core 403 is transferred to the second core 406 near the core reducing part 404.

And, the trench 408 is formed in both sides of the second core 406 by means of a mask formation process and an etching process by the commonly-used lithography. Next, a silica-based material is deposited using a deposition method such as a CVD method on the upper part of the second core 406 and in the trench 408. As a result, the second upper clad 409 and the second side part clad 411 are formed.

Next, by means of a mask formation process and an etching process by the commonly-used lithography, the silicon substrate 401 located immediately below the second core 406 is removed from the rear surface of the silicon substrate 401 and the notch 407 is formed. And then, the second lower clad 410 is formed by depositing a silica-based material in the notch 407 from the rear surface side of the silicon substrate 401 using a deposition method such as a CVD method.

The difference in the coefficients of thermal expansion between the silica-based material and the silicon substrate 401 is large. Therefore, in the deposition process to the notch 407, it is also acceptable to insert a plurality of materials into the notch 407 in several divided steps. That is to say, the thickness of the silica-based material layer inserted into the notch 407 is limited to a minimum necessary thickness to form the second lower clad 410, and a material with a small difference in the coefficient of thermal expansion from the silicon substrate 401 may be inserted into the rest of the notch 407, or the rest of the notch 407 may be composed of an air layer.

The process for depositing the second lower clad 410 after etching the silicon substrate 401 from the rear surface may be performed before or after the other process.

As described above, the spot size converter 400 is produced.

Figure 9:
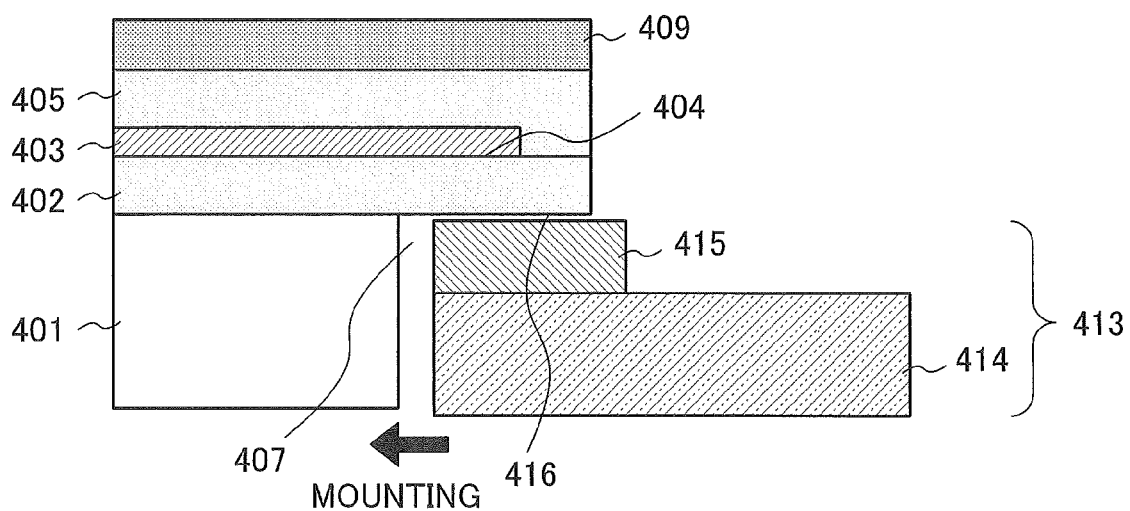
FIG. 9 is a cross-sectional view showing an example of a method for making the spot size converter in the third exemplary embodiment of the present invention.

The method for making the spot size converter 400 is not limited to the above-mentioned method, but it is also possible to make it by using another method mentioned below, for example. Another example of a method for making the spot size converter 400 will be described using FIG. 9. In the making method described using FIG. 9, the way to insert the second lower clad into the notch 407 is changed compared with the making method mentioned above. That is to say, the second lower clad is formed by mounting a mounted member 413 instead of the process for depositing the second lower clad in the notch 407. The mounted member 413 includes a base 414 fixing an optical fiber or the like, and a second lower clad 415 formed on the base 414. The second lower clad 415 is made of a material whose refractive index is smaller than that of the second core 406, for example, a silica-based material. The refractive index of the silica-based material is adjusted by controlling the amount of an additive added to $SiO_2$, for example. Examples of the additive used for adjusting of the refractive index are B, P, Ge, and the like. By mounting the mounted member 413, the second lower clad 415 is fitted into the notch 407.

Here, if a vacant space 416 remains between the second lower clad 415 and the buried oxide film layer 402, it is also acceptable to add further a material such as matching oil for adjusting the refractive index to the vacant space.

If a groove to fix an optical fiber or an optical circuit chip is formed in advance on the base 414, it is possible to perform an alignment easily in connecting the mounted member to the spot size converter 400. It is also possible to make the spot size converter 400 as mentioned above.

Next, a function of the spot size converter 400 in the present exemplary embodiment will be described. The optical energy of the light propagating through the silicon core 403 is gradually coupled to the waveguide mode formed by the second core 406 and the peripheral clad 412.

Here, in the spot size converter 400, the second core and the peripheral clad are also formed not only above the core reducing part 404 but also below it by forming the notch 407. Therefore, as compared with the related spot size converter 100 described in FIG. 1, it is possible to bring the center of the fundamental mode center of the second core close to the core reducing part. As a result, the overlap integration between the optical mode propagating through the core reducing part and the $E_{11}$ mode in the second core (fundamental mode) enlarges. On the one hand, the overlap integration between the optical mode propagating through the core reducing part and the $E_{12}$ mode in the second core (higher-order mode) becomes smaller. Accordingly, most of the optical energy of the light propagating through light the silicon core 403 becomes coupled to the $E_{11}$ mode. By that means, in the spot size converter 400, as with the spot size converter 300, even if the mode field diameter in the connection end is enlarged, it is possible to realize a low loss. Since it is possible to enlarge the mode field diameter of the second core up to 9-10 µm, for example, it is also possible to reduce the excessive loss for the position misalignment in mounting.

In the present exemplary embodiment, the notch 407 is formed by removing the silicon substrate 401 from the rear surface to the upper surface through it. Therefore, since it is possible to form the notch 407 by etching the silicon substrate 401 from its rear surface, the making method is simple. As mentioned above, since it is possible to set the material and the layer number of the layer formed in the notch 407 appropriately, a degree of freedom of design is increased. That is to say, because it becomes possible to fine-tune the refractive index of the material inserted into the notch 407, it is possible to fine-tune the center of the fundamental mode in the second core.

Figure 10:
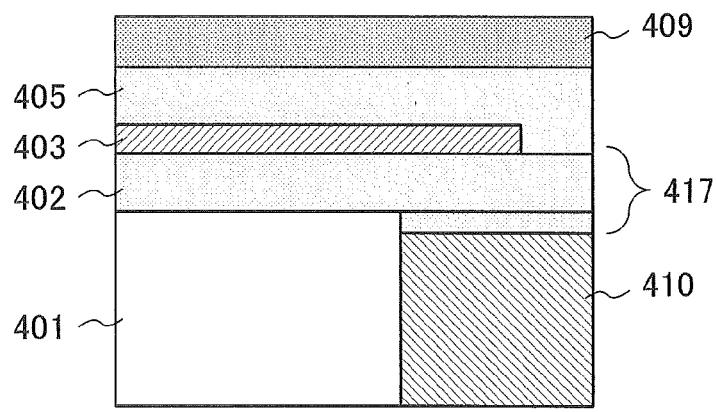
FIG. 10 is a cross-sectional view showing a schematic configuration of a modification of the spot size converter in the third exemplary embodiment of the present invention.

In the present exemplary embodiment, although only the second lower cladding layer 410 is formed into the notch 407, it is not limited to this. For example, as shown in FIG. 10, it is also acceptable to form the second lower cladding layer 410 and a part of a second lower core layer 417 in the notch 407. The second lower core layer 417 represents a layer which is formed in the lower part of the silicon core 403, composes the second core 406, and includes the buried oxide film layer 402. Here, it is usually difficult to make the thickness of the buried oxide film layer 402 larger than 3 µm. The reason is because not only a production cost becomes higher but also the potential of a warp of the substrate is increased if the thickness of the buried oxide film layer 402 is made larger than 3 µm. Therefore, there is a case that the thickness of the buried oxide film layer 402 becomes smaller than that of the first upper cladding layer 405. Accordingly, it becomes possible to equalize the overall thickness of the second lower core layer 417 to the thickness of the first upper cladding layer 405 by forming in the notch 407 a layer to be a part of the second lower core layer 417 so as to be continuous with the buried oxide film layer 402. Therefore, it is possible to bring the center of the fundamental mode of the second core 406 closer to the core reducing part 404.

The Fourth Exemplary Embodiment

Figure 11A:
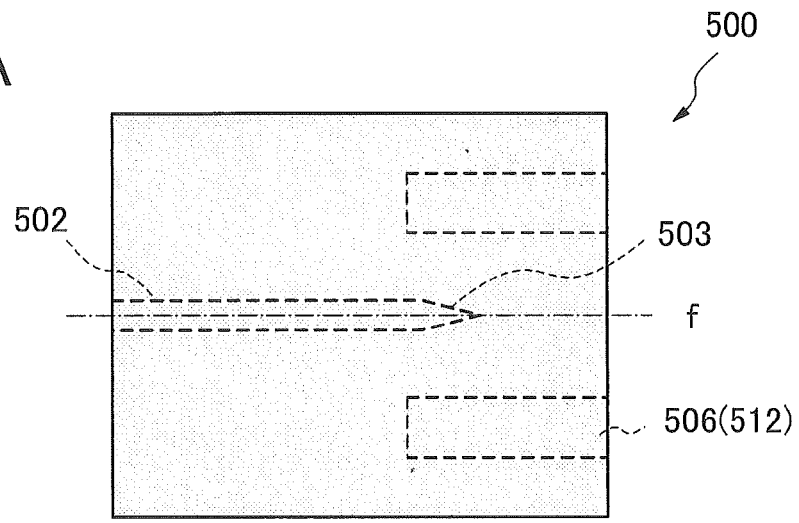
FIG. 11A is a top view showing a schematic configuration of a spot size converter in the fourth exemplary embodiment of the present invention.
Figure 11B:
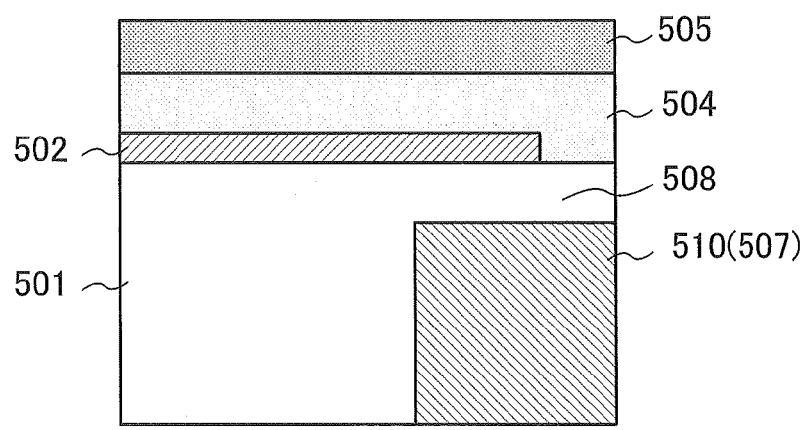
FIG. 11B is a diagram showing a schematic configuration of the spot size converter in the fourth exemplary embodiment of the present invention and is a cross-sectional view taken along the line f shown in FIG. 11A.
Figure 11C:
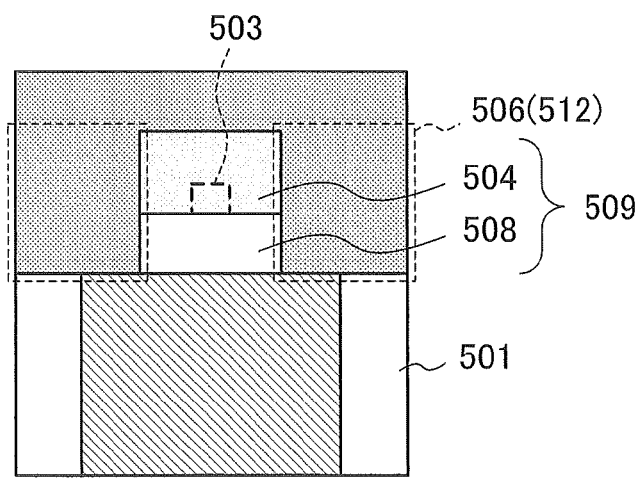
FIG. 11C is a diagram showing a schematic configuration of the spot size converter in the fourth exemplary embodiment of the present invention and is a right side view of FIG. 11A.

A spot size converter 500 in the fourth exemplary embodiment of the present invention will be described using FIG. 11. FIG. 11A is a top view of the spot size converter 500. FIG. 11B is a cross-sectional view taken along the line f shown in FIG. 11A. FIG. 11C is a right side view of FIG. 11A. Although every one of a silicon core 502, a core reducing part 503, and a second side part clad 506, which is shown by dotted lines in FIG. 11A, is not actually exposed on an upper surface as shown in FIG. 11B, they are shown in order to make their locations understandable. Much the same is true on the core reducing part 503 shown by a dotted line in FIG. 11C.

The spot size converter 500 in the present exemplary embodiment includes an SOI substrate having a silica-based substrate 501 and a silicon core 502.

Because each of the core reducing part 503, the first upper clad 504, the second upper clad 505, and the second side part clad 506 has a similar structure to the corresponding part in the spot size converter 400 of the third exemplary embodiment, the description about them is omitted.

The spot size converter 500 includes a notch 507 in which a part of the silica-based substrate 501 is removed. There is a part of the silica-based substrate left without being removed (hereinafter, referred to as a substrate residue 508) on the upper part of the notch 507. That is to say, in the spot size converter 500, instead of removing the substrate from the rear surface to the upper surface through it as the spot size converter 400, a part of the substrate in the upper surface side is left. And a second core 509 is composed by the substrate residue 508 and the first upper clad 504 near the core reducing part. In addition, a second lower clad 510 which is made of a material whose refractive index is smaller than that of the silica-based substrate 501, is formed in the notch 507. And a peripheral clad 511 is composed by the second upper clad 505, the second side part clad 506, and the second lower clad 510.

Next, a procedure for making the spot size converter 500 will be described. First, a 100 nm-thick silicon layer formed on the silica-based substrate 501 is processed by means of a mask formation process and an etching process by the commonly-used lithography. By that means, the silicon core 502 including a silicon wire waveguide with the core reducing part 503 is formed.

Next, the 6 µm-thick first upper clad 504 is formed by depositing a silica-based material on the silica-based substrate 501 and the silicon core 502 using a deposition method such as a CVD method. And a trench 512 is formed by means of a mask formation process and an etching process by the commonly-used lithography.

Next, the second upper clad 505 is formed by depositing a silica-based material on the upper part of the first upper clad 504 using a deposition method such as a CVD method. The second side part cladding layer 506 is also formed in the trench 512 by depositing a silica-based material.

Next, by means of a mask formation process and an etching process by the commonly-used lithography, the silica-based substrate 501 located immediately below the second core 509 is removed from the rear surface of the silica-based substrate 501. By that means, a notch 507 is formed. Although an etching process is started from the rear surface of the silica-based substrate 501, the etching is not performed up to the upper surface, the substrate residue 508 with 3 μm thick is left.

And then, a material whose refractive index is lower than that of the silica-based substrate 501 is deposited in the notch 507 from the rear surface of the silica-based substrate 501 using a deposition method such as a CVD method. By that means, the second lower clad 510 is formed. The second lower clad 510 is formed by depositing a silica-based material whose refractive index is lower than that of the silica-based material composing the silica-based substrate 501, for example. It is also acceptable to insert a plurality of materials into the notch 507 in several divided steps in the deposition process from the rear surface as with the third embodiment.

The etching process from the rear surface of the silicon substrate 501 and the process for forming the second lower clad 510 may be performed before or after the other process.

As mentioned above, the spot size converter 500 is produced.

Although the forming method of the notch differs between the present exemplary embodiment, the second exemplary embodiment, and the third exemplary embodiment, each method can be realized using the current semiconductor fine processing technology.

Next, a function of the spot size converter 500 in the present exemplary embodiment will be described. The optical energy of the light propagating through the silicon core 502 is gradually coupled to the waveguide mode formed by the second core 509 and the peripheral clad 511.

Here, in the spot size converter 500, the second core 509 and the second lower cladding layer 510 are formed not only above the core reducing part 503 but also below it by forming the notch 507. Therefore, even in the spot size converter 500 using the silica-based substrate, it becomes possible to realize the optical connection with low loss and reduce the excess loss for the position misalignment in mounting, as with the spot size converters 300 and 400 using the silicon substrate.

As mentioned above, although the embodiments according to the present invention were described with reference to the drawings, it is needless to say that the present invention is not limited to the embodiments. The shapes and the combinations constituting the members which were shown in the embodiments mentioned above are examples, and various changes are possible based on a design request or the like within the range without departing from the scope of the present invention.

For example, although the core reducing part in the second to the fourth embodiment was the form that the core width thereof was gradually reduced, it is not limited to this. That is, a form that a core height is reduced, or both core width and core height are reduced may be adopted.

The overlap integration of the mode of the light which propagates the core reducing part, and the fundamental mode of the second core becomes large as the core reducing part and the fundamental mode center of the second core is closer, and the optical loss is reduced. Here, thickness of an buried oxide layer of an SOI substrate is generally designed by less than 3 μm from a viewpoint of a warp of the substrate and a manufacturing cost. Therefore, in the second to the fourth embodiment, the core reducing part is somewhat closer to the substrate side than the second core cross section center. However, because the overlap integration of the mode of the light which propagates the core reducing part and the fundamental mode of the second core can be enlarged sufficient even if the core reducing part and the second core cross section center are far to some extent in this way, optical loss can be reduced sufficiently. How far the core reducing part and the cross section center of the second core should be brought close should just be determined appropriately corresponding to optical loss goal to be achieved and the relative refractive index difference of the second core and the peripheral clad. Further, it may be employed a configuration that the core reducing part is brought near the upper surface side of the optical waveguide rather than the cross section center of the second core in order to avoid that a large level difference generates due to the formation of the second core on the surface of an optical circuit chip including a spot size converter.

In the second embodiment, although the refractive index of the buried oxide film layer 302 which constitutes the second core 306 and the first upper clad 305 was made the same, it is not limited to this. That is, as long as the buried oxide film layer 302 and the first upper cladding layer 305 function as the second core 306, both refractive indexes may have some differences. It is also similar in the third and the fourth embodiment.

Although the silica-based material is inserted in the notch of the second to the fourth embodiment, it is not limited to this. That is, because the material inserted in the notch should just function as a part of the peripheral clad of the second core, it may be a material with a lower refractive index than the second core. For example, it may be a polymer material, or may be an air.

Although the SOI substrate with the silicon core was used as the first core in the second to the fourth embodiment, it is not limited to this. For example, a core layer which is made of a compound of a III-V group material, or a silica-based material may be used. And, the substrate is not limited to the silicon substrate or the silica-based substrate, it may be used a compound including a III-V group material. Thus, in the present invention, as long as the magnitude correlation of refractive indexes shown in the first embodiment is formed appropriately, the kind of the material of each component does not matter.

The peripheral clad of the second core should exist in the neighborhood of the second core at least. Accordingly, the second upper clad layer may be formed over the whole surface of the optical circuit chip having the spot size converter, or it may be formed only in the neighborhood of the second core. Similarly, the notch may also be formed only in the neighborhood of the second core, or it may be formed over an area wider than the neighborhood of the second core.

Although the width and the height of the second core were set to 9 μm, respectively in the second to the fourth embodiment by assuming to connect the spot size converter with the general single mode optical fiber with a mode field diameter of about 9~10 μm, it is not limited to that. That is, the optical waveguide of the connection destination of the spot size converter may be an optical fiber with a larger mode field diameter. In this case, according to the mode field diameter of the optical fiber of the connection destination, a width and a height of the second core are changed appropriately. And, the optical waveguide for the connection destination of the spot size converter is not limited to the optical waveguide of the optical fiber, and it may be an optical waveguide formed on another optical circuit chip.

Moreover, in the second to the fourth embodiment, three kinds of formation methods of the notch were shown. That is, the notch is formed only in the upper surface side of the substrate in the second embodiment, the notch is formed by penetrating from the rear surface of the substrate to the upper surface thereof in the third embodiment, and the notch is formed only in the back side of the substrate in the fourth embodiment. It can be set up appropriately about what method of these methods is adopted corresponding to the material to be used, or the operating mode of the spot size converter.

A part or all of the embodiments mentioned above can be described also like the following notes, but it is not limited to the followings.

(Note 1) A spot size converter including: a substrate whereon an optical waveguide with a first core is layered, the substrate further including a notch; a core reducing part which is formed such that the cross section of the first core gradually shrinks toward the end part of the first core in the optical waveguide direction; a second core which surrounds the periphery of the core reducing part and is made of a material with a lower refractive index than the first core; and a peripheral clad which surrounds the second core and is made of a material with a lower refractive index than the second core, wherein a lower part clad which is a part of the peripheral clad which is formed on a lower part of the second core is formed in the notch.

(Note 2) The spot size converter according to note 1, wherein the lower clad is formed in the notch by laminating plural layers made of a material with a lower refractive index than the second core.

(Note 3) The spot size converter according to notes 1 or 2, wherein the peripheral clad includes the lower clad, an upper clad formed on an upper part of the second core, and a side part clad formed on both side parts of the second core, wherein the lower clad and the upper clad are made of a same material.

(Note 4) The spot size converter according to any one of notes 1 to 3, wherein the substrate is notched so as to be pierced from a lower surface to an upper surface thereof in an area directly under the second core.

(Note 5) The spot size converter according to any one of notes 1 to 4, wherein a part of a second lower core layer formed in the lower part of the first core of the second core is formed in the notch.

(Note 6) The spot size converter according to any one of notes 1 to 5, wherein the substrate is a silicon substrate, a silicon oxide layer is formed on the silicon substrate, the first core is a silicon core formed on the silicon oxide layer, and a second lower core layer formed in the lower part of the first core of the second core includes the silicon oxide layer at least.

(Note 7) The spot size converter according to any one of notes 1 to 5, wherein a second lower core layer formed in the lower part of the first core of the second core is composed of a part of the substrate.

(Note 8) The spot size converter according to note 7, wherein the substrate is a silica substrate and the first core is a silicon core.

(Note 9) The spot size converter according to any one of notes 1 to 8, wherein the core reducing part terminates before end face of the second core in the optical waveguide direction.

(Note 10) A manufacturing method of a spot size converter including: a laminating process of laminating an optical waveguide which includes a first core with a core reducing part in which a cross section gradually shrinks toward an end part of the optical waveguide direction, and a second core which surrounds a periphery of the core reducing part and is made of a material with a lower refractive index than the first core; a side part clad formation process of forming a side part clad in both ends of the second core; an upper clad formation process of forming an upper clad on an upper part of the second core; and a lower clad formation process of a lower clad on a lower part of the second core, wherein the lower clad formation process includes a substrate removal process of forming a notch by removing a substrate located in the directly under area of the second core.

(Note 11) The manufacturing method of a spot size converter according to note 10, wherein the lower clad formation process includes a process of laminating plural layers made of a material with a lower refractive index than the second core.

(Note 12) The manufacturing method of a spot size converter according to notes 10 or 11, wherein the side part clad formation process includes a trench formation process of forming trenches in both ends of the second core, and the substrate removal process includes removing a substrate located in the directly under area of the second core by introducing an etchant in the trenches.

(Note 13) The manufacturing method of a spot size converter according to note 12, wherein the substrate removal process includes a process of etching the substrate from a lower surface thereof on which the optical waveguide is not formed.

(Note 14) The manufacturing method of a spot size converter according to note 10, wherein the lower clad formation process includes a mounting process of mounting a mounted member which includes a base, and a lower clad formed on the base and made of a material with a lower refractive index than the second core, and the mounting process includes a process of fitting the lower clad in the notch.

The present application is based upon and claims the benefit of priority from Japanese Patent Application No. 2011-034784, filed on Feb. 21, 2011, the disclosure of which is incorporated herein in its entirety by reference.

DESCRIPTION OF THE CODES 100 related spot size converter
200, 300, 400, 500 spot size converter.
101, 201 substrate
301, 401 silicon substrate
102, 302, 402 buried oxide film layer
103, 303, 403, 502 silicon core
104, 203, 304, 404, 503 core reducing part
105, 204, 306, 406, 509 second core
106, 309, 409, 505 second upper clad
107, 205, 312, 412 peripheral clad
202 first core.
206 lower clad
310, 410, 415, 510 second lower clad
207, 307, 407, 507 notch
208 optical waveguide.
305, 405, 504 first upper clad
308, 408, 512 trench
311, 411, 506 second side part clad
313, 417 second lower core layer
314 first silicon substrate
315 mask
316 second silicon substrate 413 mounted member
414 base
501 silica-based substrate.
508 substrate residue

The invention claimed is:

1. A spot size converter, comprising:
a substrate on which an optical waveguide including a first core is laminated and which comprises a notch;
a core reducing part which is formed so that a cross-section area of the first core gradually decreases toward an end part of the first core in the direction of light propagation;
a second core which surrounds the core reducing part and comprises a material whose refractive index is smaller than that of the first core;
a peripheral clad which surrounds the second core and comprises a material whose refractive index is smaller than that of the second core; and
wherein a portion of said peripheral clad is formed under a lower part of the second core, said portion defining a lower clad;
wherein the lower clad is formed in the notch.

2. The spot size converter according to claim 1, wherein the lower clad is formed in the notch by laminating a plurality of layers, each of which comprises a material whose refractive index is lower than that of the second core.

3. The spot size converter according to claim 1, wherein the substrate is removed from an upper surface to a rear surface in an area just beneath the second core.

4. The spot size converter according to claim 1, wherein a second lower core layer is formed under a lower part of the first core, said second lower core layer defining the second core;
wherein a part of the second lower core layer is formed in the notch.

5. The spot size converter according to claim 1, wherein the substrate comprises a silicon substrate;
a silicon oxide film layer is formed on the silicon substrate;
the first core comprises a silicon core formed on the silicon oxide film layer; and
a second lower core layer, which is formed under a lower part of the first core and defines the second core, comprises the silicon oxide layer.

6. The spot size converter according to claim 1, wherein a second lower core layer, which is formed under a lower part of the first core and defines the second core, includes a part of the substrate.

7. The spot size converter according to claim 6, wherein the substrate comprises a silica substrate, and the first core comprises a silicon core.

8. A method for making a spot size converter, comprising:
a laminating process for laminating an optical waveguide comprising a first core including a reducing part whose cross-section area gradually decreases toward an end part in the direction of light propagation, and a second core which surrounds the reducing part and comprises a material whose refractive index is smaller than that of the first core; a side part clad formation process for forming a side part clad at each side of the second core; an upper clad formation process for forming an upper clad on an upper part of the second core; and a lower clad formation process for forming a lower clad beneath a lower part of the second core; wherein the lower clad formation process comprises a substrate removal process for forming a notch by removing a substrate located in an area just beneath the second core.

9. The method for making a spot size converter according to claim 8,
wherein the side part clad formation process comprises a trench formation process for forming a trench at each side of the second core, and
the substrate removal process comprises a process for removing a substrate located in an area just beneath the second core by introducing an etchant into the trench.

10. The method for making a spot size converter according to claim 8,
wherein the lower clad formation process comprises a mounting process for mounting a mounted member;
the mounted member comprises a base, and a lower clad which is formed on the base and comprises a material whose refractive index is smaller than that of the second core; and
the mounting process comprises a process for fitting the lower clad into the notch.

* * * * *